(12) United States Patent
Shimabukuro et al.

(10) Patent No.: US 9,979,166 B2
(45) Date of Patent: May 22, 2018

(54) ELECTRICAL CABINET SERVICE DOOR WITH INTEGRATED DEAD FRONT

(71) Applicant: POWER DISTRIBUTION, INC., Richmond, VA (US)

(72) Inventors: Richard Shimabukuro, Tustin, CA (US); Long Justin Nguyen, Mechanicsville, VA (US); Isaac Folk, Glen Allen, VA (US); Christopher Morgan Davis, Richmond, VA (US); Mingbo Zhao, Doylestown, PA (US)

(73) Assignee: POWER DISTRIBUTION, INC., Richmond, VA (US)

( * ) Notice: Subject to any disclaimer, the term of this patent is extended or adjusted under 35 U.S.C. 154(b) by 0 days. days.

(21) Appl. No.: 15/494,133

(22) Filed: Apr. 21, 2017

(65) Prior Publication Data

US 2017/0310091 A1    Oct. 26, 2017

Related U.S. Application Data

(60) Provisional application No. 62/326,433, filed on Apr. 22, 2016.

(51) Int. Cl.
*H02B 1/38* (2006.01)
*H02B 1/30* (2006.01)

(52) U.S. Cl.
CPC ............. *H02B 1/38* (2013.01); *H02B 1/306* (2013.01)

(58) Field of Classification Search
None
See application file for complete search history.

(56) References Cited

U.S. PATENT DOCUMENTS

| | | | | |
|---|---|---|---|---|
| 6,512,669 B1* | 1/2003 | Goodwin | ............... | H02B 1/28 200/50.12 |
| 6,784,385 B2* | 8/2004 | Hernandez-Perez | .... | H02B 1/03 200/50.33 |
| 7,142,950 B2* | 11/2006 | Rasmussen | ............... | H02J 9/06 307/7 |
| 2006/0265853 A1* | 11/2006 | Povolny | .................. | H02B 1/30 29/462 |
| 2007/0053142 A1* | 3/2007 | Allen | .................. | H01H 9/0264 361/647 |
| 2008/0092449 A1* | 4/2008 | Kadziolka | ................ | H02B 1/38 49/357 |
| 2011/0310534 A1* | 12/2011 | Cosley | .................... | H02B 1/32 361/632 |
| 2014/0210323 A1* | 7/2014 | Lakoduk | ................. | H02B 1/46 312/223.1 |

(Continued)

*Primary Examiner* — Courtney Smith
(74) *Attorney, Agent, or Firm* — Bacon & Thomas, PLLC

(57) ABSTRACT

In order to reduce service procedure time and labor costs, while increasing overall uptime, the electrical equipment cabinet of the invention includes a main service door that is integrated with the dead front. The dead front panel is fixed to and movable with the main service door, and therefore access to high voltage equipment situated behind the dead front is achieved by simply opening the main service door, without the need to first unlock and open the main service door and then unlock, open, and/or remove the dead front panel. Controls on the front side of the dead front are easily and safely accessible, when the main service door is closed, through a dead front control access door positioned within an opening of the main service door.

11 Claims, 1 Drawing Sheet

(56) References Cited

U.S. PATENT DOCUMENTS

2015/0036267 A1* 2/2015 Miller .................. H02B 1/03
　　　　　　　　　　　　　　　　　　　　361/625
2016/0241007 A1* 8/2016 Tremaine ............... H02G 3/123

* cited by examiner

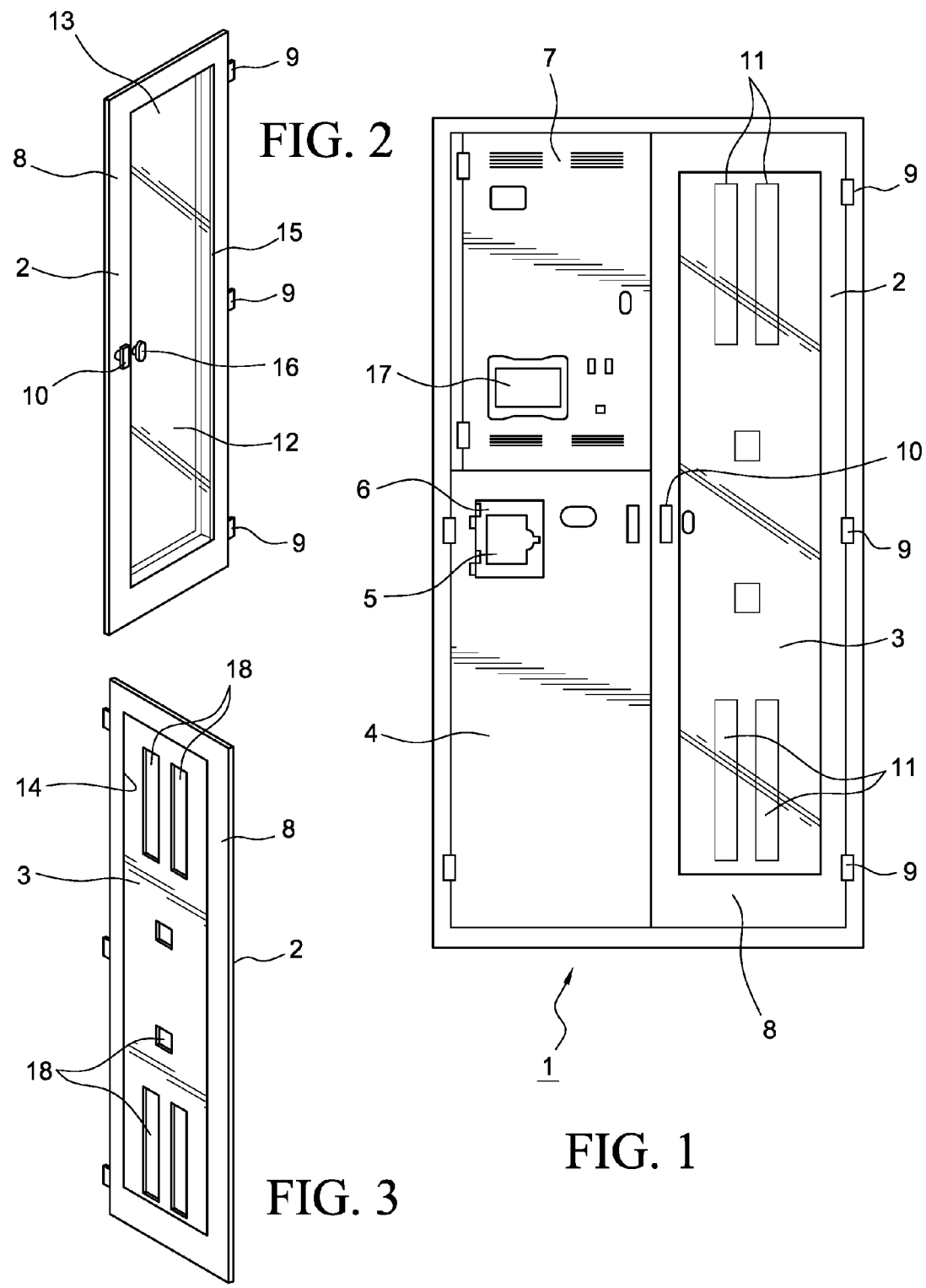

ELECTRICAL CABINET SERVICE DOOR WITH INTEGRATED DEAD FRONT

This application claims the benefit of U.S. Provisional Patent Appl. Ser. No. 62/326,433, filed Apr. 22, 2016, and incorporated herein by reference.

BACKGROUND OF THE INVENTION

1. Field of the Invention

The invention relates to an electrical equipment cabinet, and in particular to an electrical equipment cabinet containing high voltage electrical equipment and controls that are accessed through a dead front. The electrical equipment cabinet may be a power distribution unit.

In order to reduce service procedure time and labor costs, while increasing overall uptime, the electrical equipment cabinet of the invention includes a main service door that is integrated with the dead front. Because the dead front panel is fixed to and movable with the main service door, access to high voltage equipment situated behind the dead front is achieved by simply opening the main service door, without the need to first unlock and open the main service door and then unlock, open, and/or remove the dead front panel.

On the other hand, controls on the front side of the dead front are easily and safely accessible, when the main service door is closed, through a dead front control access door positioned within an opening of the main service door.

2. Description of Related Art

High voltage electrical equipment cabinets are required to include dead fronts that allow access to controls such as circuit breakers while isolating the high voltage equipment in order to protect the operator of the controls from electrical shock. When access to the high voltage equipment is required, the dead front is opened or removed by service personnel.

To provide further protection, a lockable main service door is conventionally provided at the front of the cabinet. Access to the dead front requires unlocking and opening of the main service door. Access to the high voltage equipment thus requires two steps: first, the main service door must be opened to access the dead front, and only then can the high voltage equipment be accessed by opening or removing the dead front.

An example of a high voltage electrical equipment cabinet accessible in this manner is the "power distribution unit," which includes one or more transformers, with a panel board and/or subfeeds to distribute power from a common input source to multiple output circuits or equipment. Such units are used in server farms and other facilities where multiple power distribution units may be provided. Servicing the multiple power distribution units can entail substantial costs, including labor cases and the cost of equipment downtime. Extra time spent accessing equipment for servicing can only add to those costs.

SUMMARY OF THE INVENTION

The invention provides an improved electrical equipment cabinet door arrangement that reduces the time required to access high voltage electrical equipment protected by a dead front. The invention also offers a cabinet service door and dead front with simplified construction and decreased manufacturing/assembly costs.

The improved electrical equipment cabinet includes a service door that is modified to include an integrated dead front accessible through an access door provided in the main service. Because the dead front is integrated with the main service door, it moves or travels with the main service door when the main service door is opened, allowing high voltage components to be accessed immediately upon opening the main service door, without having to open or remove the dead front. On the other hand, quick access to the dead front is provided through the access door, without having to open the main service door.

Each of the main service door and the access door may be provided with its own lock. Despite the dual locks, access to the high voltage components and access to the dead front each requires only a single unlocking operation.

In a preferred embodiment of the invention, a main service door with an integrated dead front includes a hinged and lockable service door frame having a dead front access opening in which is positioned an access door to provide rapid access to a dead front panel attached to the service door frame and positioned behind the access door. The dead front access opening may be rectangular and provided at the center of the door frame, although it is possible for the opening to have shapes that are not strictly rectangular, and to provide the opening at non-centered positions of the service door frame. The service door frame itself is preferably rectangular so as to fit a conventional electrical equipment cabinet, although other shapes are also possible.

Preferably, the service door frame includes a locking side and a hinge side. A service door hinge is attached to the hinge side of the service door frame and a service door lock is attached to the locking side of the service door frame. The access door is positioned within the dead front access opening of the service door frame, and movable between an open position and a closed position independently of a position of the service door frame. An access door lock is attached to the access door and positioned adjacent to the service door lock when the access door is in the closed position, and a dead front panel is attached to the door and positioned behind the access door.

An exemplary application for the integrated main service door and dead front of the invention is in a power distribution unit. However, the invention is not necessarily limited to a particular power distribution unit, or to power distribution units in general, but may also be applied to other electrical equipment cabinets in which high voltage equipment is protected by a dead front, and the dead front is accessible through a main service door.

BRIEF DESCRIPTION OF THE DRAWINGS

FIG. 1 is a front view of a high voltage electrical equipment cabinet having an integrated main service door and dead front constructed in accordance with the principles of a preferred embodiment of the invention.

FIG. 2 is a perspective view, taken from the front, of the high voltage electrical equipment cabinet main service door of the embodiment of FIG. 1, including an access door mounting an opening in the main service door.

FIG. 3 is a perspective view, taken from the rear, of the high voltage electrical equipment cabinet main service door illustrated in FIG. 2, to which a dead front has been mounted.

DETAILED DESCRIPTION OF THE PREFERRED EMBODIMENTS

Throughout the following description and drawings, like reference numbers/characters refer to like elements. It should be understood that, although specific exemplary embodiments are discussed herein there is no intent to limit the scope of present invention to such embodiments. To the contrary, it should be understood that the exemplary embodiments discussed herein are for illustrative purposes, and that modified and alternative embodiments may be implemented without departing from the scope of the present invention.

FIG. 1 shows and a high voltage electrical equipment cabinet 1 arranged to house a power distribution unit (PDU). The power distribution unit houses high voltage electrical equipment, a panel board, a branch circuit monitor, and other PDU components, which form no part of the present invention and are not illustrated.

As illustrated in FIG. 1, the cabinet 1 is a parallelepiped-shaped unit with a rectangular front that includes a main service door 2 through which dead front 3 is accessible, as well as auxiliary service door 4 with access to a breaker 5 provided through a separate access door 6, and a third service door 7 that provides access to a branch circuit monitor and includes a touch screen display 17 operable from outside the cabinet without opening any doors. Doors 4 and 7 are optional and not necessary elements of the present invention, which may be applied to a high voltage electrical equipment cabinet with only a single service door, so long as the cabinets includes high voltage equipment protected by a dead front situated behind the single service door. As a result, only the main service door 2 will be described in detail herein, in connection with FIGS. 2 and 3.

Turning to FIG. 2, the main service door 2 is integrated with the dead front 3 by welding or otherwise fixedly securing the dead front to a frame 8, for example by securing the dead front 3 to mounting flanges 14 extending inwardly from four sides of the frame 8. The dead front 3 includes openings 18 for the controls 11, but otherwise is a solid insulated panel. A plurality of hinges 9 are attached to one side of the frame 8, and extend outwardly so that they can also be attached to the cabinet 1 to enable the main service door 2, including hinged main service door frame 8, to be to be opened. Since the dead front 3 is fixed to the main service door 2, it moves with the main service door frame 8, exposing high voltage equipment in the interior of the cabinet that is isolated by the dead front 3 when the main service door 2 is closed. As a result, the high voltage equipment can be accessed without separately opening or removing the dead front 3.

In the illustrated embodiment, a main service door lock 10 is provided on a side of the main service door frame 8 that is opposite the side to which hinges 9 are secured. Main service door lock 10 cooperates with a corresponding lock mechanism on the cabinet 1 to lock the main service door 2 in a closed position in which the dead front 3 isolates the high voltage electrical equipment situated behind the dead front. In this position, the controls 11, which may include breaker switches extending from breakers on a high voltage panel board mounted within the cabinet 1, but also may include other user-operable controls, are accessible by opening a dead front control access door 12 provided in a correspondingly-shaped opening 13 in the frame 8 and positioned in front of the dead front 3. The access door 12 and corresponding opening 13 are illustrated as being centrally located in the frame 8, and having a rectangular shape, but the location and shape of the access door 12 and opening 13 may be varied without departing from the scope of the invention.

The access door 12 is provided on one side with at least one hinge 15 and on a second side with an access door lock 16. The hinge 15 extends outward from the access door so that it may be secured to the frame 8 of the main service door 2 and enable the access door 12 to be opened outwardly with respect to the main service door 2 when the main service door 2 is in a closed position and, optionally, locked, thereby providing access to the controls 11 while being protected from high voltages by the dead front 3. The access door lock 16 cooperates with a corresponding lock mechanism in the frame 8 of the service door.

As illustrated, the access door 12 is made of a transparent or translucent material so that the controls 11 and any indicators on the dead front 3 are visible from outside the cabinet 1 when the access door 12 is closed and, optionally, locked. However, it is also within the scope of the invention to provide an opaque access door 12, or to provide windows or a display on the access door 12.

What is claimed is:

1. A high voltage electrical equipment cabinet, comprising:
   a main service door; and
   a dead front having at least one control on one side, for protecting a user from high voltages carried by high voltage electrical equipment when the at least one control is operated,
   wherein:
   the main service door is integrated with the dead front such that the dead front moves with the main service door, exposing the high voltage electrical equipment when the main service door is opened, and
   access to the at least one control is provided by an access door secured to the main service door, the at least one control being accessible through an access door opening in the main service door when the main service door is closed and the access door is open.

2. A high voltage electrical equipment cabinet as claimed in claim 1, wherein the main service door includes a main service door frame, and the access door is secured to the main service door frame by hinges on one side of the access door.

3. A high voltage electrical equipment cabinet as claimed in claim 2, wherein the access door further includes an access door lock that cooperates with an access door locking mechanism in the main service door frame to lock the access door.

4. A high voltage electrical equipment cabinet as claimed in claim 3, wherein the access door is at least partially transparent or translucent to enable viewing of the at least one control when the access door is closed.

5. A high voltage electrical equipment cabinet as claimed in claim 3, wherein the main service door is secured to a cabinet frame by hinges and includes a main service door lock that cooperates with a main service door locking mechanism in the cabinet frame to lock the main service door when the main service door is closed.

6. A high voltage electrical equipment cabinet as claimed in claim 3, wherein the high voltage electrical equipment cabinet is a power distribution unit (PDU) cabinet.

7. A high voltage electrical equipment cabinet as claimed in claim 1, wherein the main service door is secured to a cabinet frame by hinges and includes a main service door lock that cooperates with a main service door locking mechanism in the cabinet frame to lock the main service door when the main service door is closed.

8. A high voltage electrical equipment cabinet as claimed in claim 1, wherein the high voltage electrical equipment cabinet is a power distribution unit (PDU) cabinet.

9. A high voltage electrical equipment cabinet main service door, comprising:

a main service door frame;

hinges secured to an extending from one side of the main service door frame for pivotally securing the main service door frame to an electrical equipment cabinet;

a lock situated on a second side of the main service door frame for locking the main service door frame to the electrical equipment cabinet;

a dead front fixed to and movable with the main service door frame, the dead front having at least one control on one side for protecting a user from high voltages carried by high voltage electrical equipment when the at least one control is operated, an access door secured to the main service door, the at least one control being accessible through an access door opening in the main service door when the main service door is closed and the access door is open, wherein the main service door includes a frame, and the access door is secured to the frame by hinges on one side of the access door, wherein the access door further includes an access door lock that cooperates with an access door locking mechanism in the main service door frame to lock the access door in a closed position.

10. A high voltage electrical equipment cabinet as claimed in claim 9, wherein the access door is at least partially transparent or translucent to enable viewing of the at least one control when the access door is closed.

11. A high voltage electrical equipment cabinet as claimed in claim 9, wherein the high voltage electrical equipment cabinet door is a main service door of a power distribution unit (PDU) cabinet.

* * * * *